(12) United States Patent
Lee et al.

(10) Patent No.: US 6,253,627 B1
(45) Date of Patent: Jul. 3, 2001

(54) THIN-LINE TOWED-ARRAY FORCE MEASUREMENT APPARATUS AND METHOD

(75) Inventors: An-Keun Peter Lee, East Greenwich; Michael R. Williams, West Kingston, both of RI (US); Todd E. Whitaker, East Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/592,507

(22) Filed: Jun. 12, 2000

(51) Int. Cl.[7] .................................................. G01L 1/26

(52) U.S. Cl. .................... 73/862.393; 73/862.57; 73/862.627; 367/20

(58) Field of Search .................... 73/862.393, 862.391, 73/862.627, 862.42, 862.392, 862.57; 367/20

(56) References Cited

U.S. PATENT DOCUMENTS

| | | | | |
|---|---|---|---|---|
| 4,554,650 | * | 11/1985 | Brown et al. | 367/154 |
| 4,685,090 | * | 8/1987 | Krevor | 367/20 |
| 5,046,055 | * | 9/1991 | Ruffa | 367/154 |
| 5,777,954 | * | 7/1998 | Hepp | 367/20 |
| 5,948,959 | * | 9/1999 | Peloquin | 73/1.83 |
| 6,088,297 | * | 7/2000 | Stottlemeyer | 367/131 |

* cited by examiner

Primary Examiner—Benjamin R. Fuller
Assistant Examiner—Andre Allen
(74) Attorney, Agent, or Firm—Michael J. McGowan; James M. Kasischke; Prithvi C. Lall

(57) ABSTRACT

An apparatus for measuring the force applied to a thin-line towed array having a towed array hose formed as part of a thin-line towed array. Coupling components divide the interior of the towed array hose into compartments. Axial tension measurement devices are located within one compartment, and bend measurement devices are located in another compartment. These measurement devices are electrically connected to a digitization and encoding module which is in turn connected to a processing device for providing measurements of the forces on the array.

13 Claims, 3 Drawing Sheets

THIN-LINE TOWED-ARRAY FORCE MEASUREMENT APPARATUS AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to thin-line towed-arrays, and more particularly to an apparatus that measures tension on thin-line towed-arrays during towed-array deployment and retrieval processes.

(2) Description of the Prior Art

Submarines deploy thin-line towed-arrays using mechanical handling systems. A thin-line array element includes an outer sheath or hose that contains hydrophones and supporting electronics. When the towed-array is deployed or retrieved, it is fed through a guide tube by a handling system. There is a great interest to quantify the handling system effects on the thin-line towed-array and its internal elements. Such quantitative information is useful for thin-line towed-array maintenance scheduling and design. By knowing the amount of stress applied to the thin-line towed-array during a typical deployment or retrieval process, faults may be predicted more accurately. Additionally, new sensor and material durability may be evaluated against existing designs.

There is currently no reliable method to evaluate the tension applied to a thin-line towed-array by the handling system during deployment and retrieval.

What is needed is an apparatus and method that measure the forces exerted upon a thin-line towed-array by the handling system during deployment and retrieval.

SUMMARY OF THE INVENTION

It is a general purpose and object of the present invention to provide an apparatus and method to measure the force applied to a thin-line towed-array by the handling system that deploys and retrieves the towed-array.

It is a further object to use a combination of tension and bending measurements to evaluate the handling system.

It is another object to provide such measurement device as part of a module that can be incorporated within a thin-line towed-array hose or outer-sheath.

It is yet a further object to integrate the measurement device to a tow cable for communication to a data processing system for evaluation.

Other objects and advantages of the present invention will become more obvious hereinafter in the specification and drawings.

These objects are accomplished with the present invention by several modules that are incorporated within the standard thin-line towed-array configuration and positioned within the thin-line towed-array hose. The modules comprise tension sensors, bend sensors, and system electronics. Tension sensors are configured to measure axial tension applied to the towed-array during the deployment and retrieval processes, while bending sensors measure the bending load applied to simulated telemetry canisters. The sensor outputs are encoded and digitized by system electronics before transmitted through a towline for further data conditioning and processing. The tension and bending sensor data provide information to evaluate the force exerted by the handling system on the thin-line towed-array and its elements.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
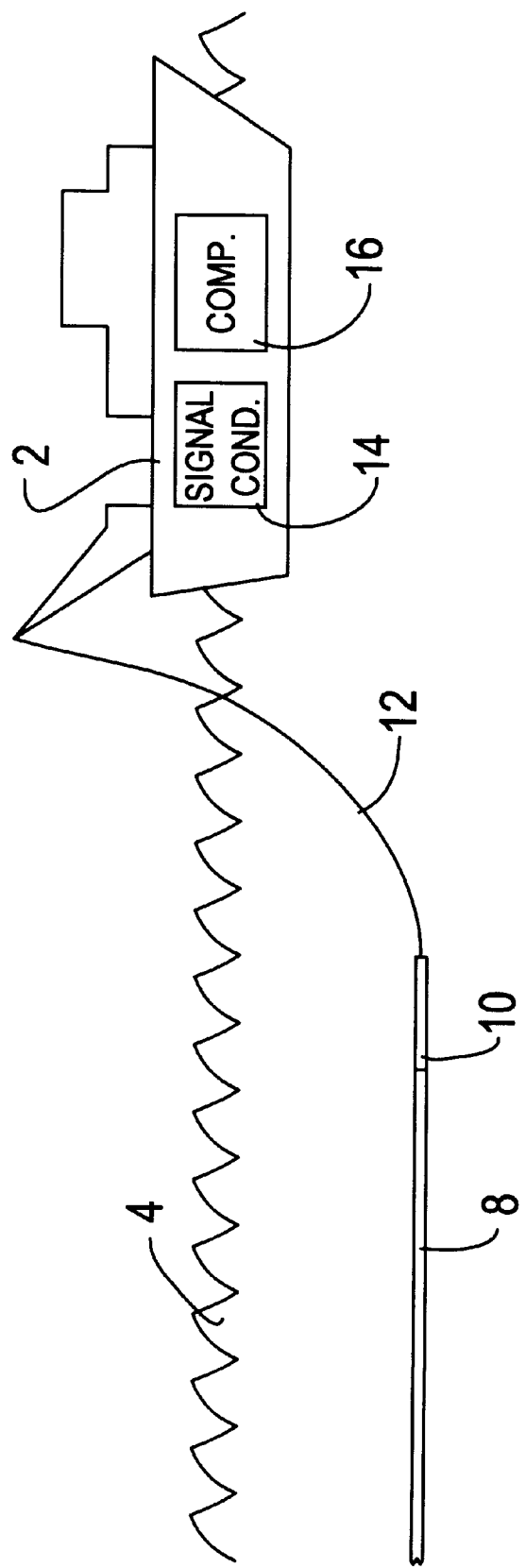
FIG. 1 is a diagram of a basic thin line towed array system.

Referring now to FIG. 1, there is shown a basic system configuration. A surface or undersea vessel 2 tows the thin-line array 8 at or below the surface 4 of a body of water. Test module 10 is positioned at the forward end of the towed array 8. The tow cable 12 provides an electrical connection between the test modules and the signal conditioning electronics 14 that amplify and filter the signals before interfacing to a computer 16. The computer 16 collects the system sensor data and performs the processing to evaluate system performance. The computer 16 and signal conditioning electronics 14 are positioned on the vessel 2.

Figure 2:
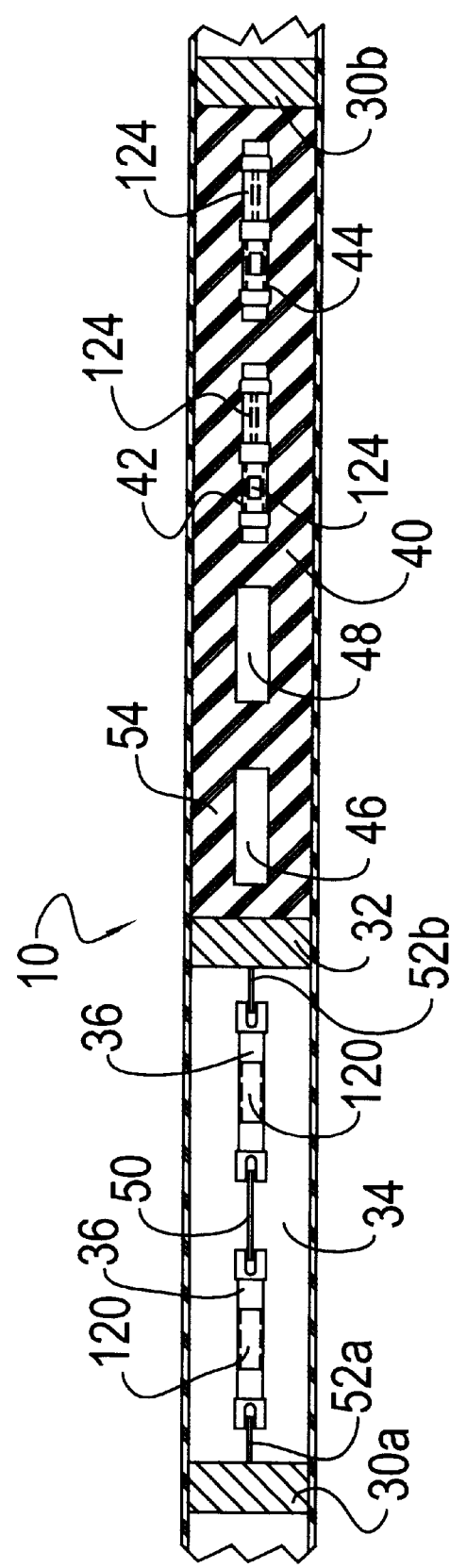
FIG. 2 is a cross-sectional view of the basic tension and bend sensor configuration within the thin-line towed-array.

FIG. 2 provides a cross-sectional detail view of two thin-line towed-array measurement module compartments that house tension and bend sensors. Couplings 30a and 30b separate the two measurement module compartments from the remainder of the thin-line towed array 8. The tension and bend compartments are similarly coupled 32 to allow electronic signals to pass between the two test module regions.

The test module 10 has a tension compartment 34 located closest to the front of the towed-array and containing two tension sensor modules 36. The test module 10 compartment, hereinafter referred to as the bending compartment 40, contains two bending sensor modules 42, 44 and two electronics canisters 46, 48. The electronics digitize and encode the tension and bend measurements before transmitting them to the signal conditioning electronics for filtering and amplification.

The tension compartment 34 is filled with synthetic oil. The two tension sensors 36 each have two ends. The tension sensors are connected together by a steel cable 50, with the remaining end of each tension sensor connected to coupling 30, 32 by nylon rope 52a, 52b. While nylon is specified for ropes 52a, 52b, this material can be any material with suitable elasticity, corrosion resistance and durability. The steel cable 50 can be made from any material relatively inelastic in comparison to the ropes 52a, 52b. Each tension sensor 36 is electronically connected to a different electronics canister 46, 48 to provide redundancy. Strain gages 120 are mounted on two sides of the tension sensor's rectangular sensor mounting section 64, and the strain gages 120 are configured in a wheatstone bridge to measure tension.

As the thin-line towed array measurement module section 34 passes through towed array handling sheaves, the tension compartment 34 experiences tension that is transferred to the nylon ropes 52a, 52b securing the tension sensors 36, thereby transferring the tension to the strain gages 120 that measure the forces exerted by the handling system. Nylon ropes 52a, 52b stretch with the array to allow bending. Steel cable 50 does not allow a significant amount of stretching thereby ensuring that the sensors 36 are subject to the same forces. The tension measurements are received in the bend compartment 40 by the electronic canisters 46, 48 for digitizing and encoding.

Similarly, the two bend sensors 42, 44 are electronically connected to a different electronic canister 46, 48 for redundancy; however, the bend sensors 42, 44 and electronic canisters 46, 48 are secured within the bend compartment 40 using foam rubber 54. Strain gages are also utilized in wheatstone bridge configurations to measure bend in the bend compartment 40. Redundancy in the bend measurements is achieved with two identical bend canisters 42, 44 that provide orthogonal bend measurements.

Each bend canister 42, 44 includes four strain gages 124 comprising two orthogonal wheatstone bridges. Because each bend sensor further comprises two sensor mounting sections, the first sensor mounting section of each bend sensor comprises one wheatstone bridge configuration of two strain gages, while the second sensor mounting section of each bend sensor comprises a distinct second wheatstone bridge configuration of two strain gages. As the bend compartment 40 passes through the mechanical handling sheaves, the redundant bend sensors 42, 44 record the bending force applied to the bend canisters to quantify the towed-array distortion. The bend measurements are transferred to the electronic canisters 46, 48 for digitization and recording. The electronic canisters 46, 48 transfer the digitized and encoded tension and bend measurements to signal conditioning electronics for filtering and amplification.

Figure 3:
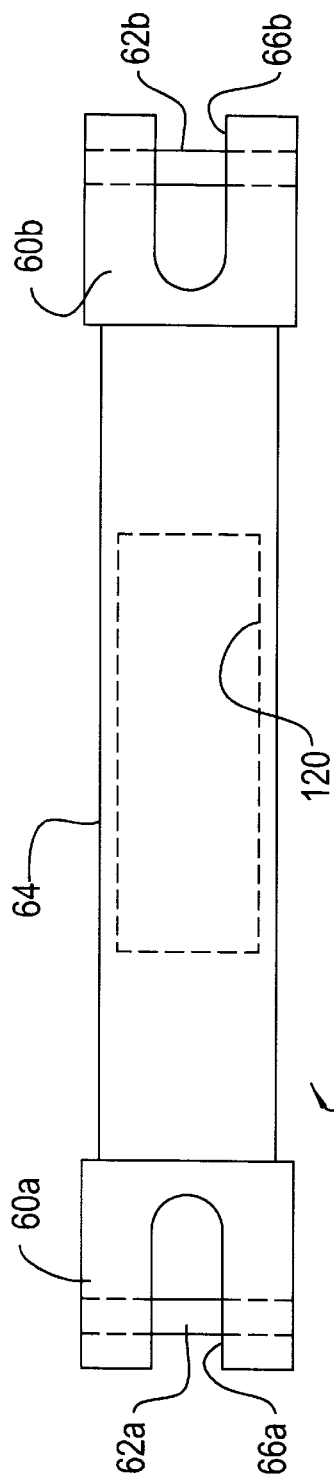
FIG. 3 is an exterior view of the tension sensor container showing the interior arrangement with hidden lines.

Referring now to FIG. 3, there is a diagram of a tension sensor 36. The sensor 36 comprises three sections: end sections 60a, 60b, pins 62a, 62b, and sensor mounting section 64. The two end sections 60a, 60b are rectangular with two smooth sides and two sides containing a u-shaped indentation 66a, 66b. The rectangular cross-section sensor mounting section 64 connects the end sections such that the end section u-shaped indentations 66a, 66b face away from the sensor mounting section 64. Each end section additionally contains a circular, oblong pin 62a, 62b that traverses the u-shaped indentation 66a, 66b. The u-shaped indentation section 66a, 66b and pin 62a, 62b combination allow the steel cable and nylon rope to attach to the tension sensor pin. The cable or rope is inserted into the end section u-shaped indentation 66a, 66b, around the pin 62a, 62b, and thence out of the u-shaped indentation 66a, 66b to secure the cable or rope to the tension sensor.

The tension sensor's sensor mounting section 64 contains four smooth rectangular sides to provide sensor mounting surfaces. A sensor 120 is indicated by hidden lines as mounted on one side of sensor mounting section 64. The sensor mounting section is connected directly to the end sections 60a, 60b such that tension on the nylon rope or steel cable translates to the sensor mounting section 64.

Figure 4:
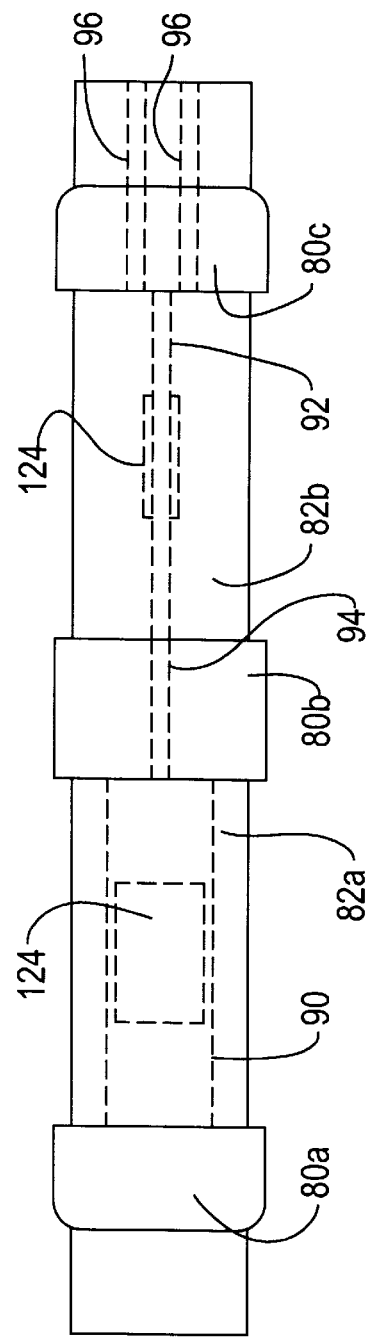
FIG. 4 is an exterior view of the bend sensor container showing the interior arrangement with hidden lines.

Referring now to FIG. 4, there is shown a bend sensor canister 42. The bend sensor canister has the same external shape as a telemetry canister in a typical thin-line towed-array configuration. Although the bend sensor canister 42 may have different configurations, the goal of the preferred embodiment is the provision of orthogonal bend measurements within a single bend sensor canister. The bend sensor canister 42 is preferably an aluminum canister having three support sections 80a, 80b, 80c and two sensor sections 82a, 82b. A rectangular bridge 90, 92 traverses the interior of each sensor section 82a, 82b, respectively. The bridge orientation alternates in the two bend sensor sections to allow orthogonal bend sensor positioning and measurements. The rectangular bridge surfaces allow sensor 124 mounting directly on the bridge surfaces. Sensor wiring from the first bend sensor section 82a travels through an outlet 94 in the middle support section 80b to the second bend sensor section 82b. Electronic wiring from the first and second bend sensor sections 82a, 82b is then transferred out of the second bend sensor section 82b using outlets 96 in the end support structure 80c, whereupon the wiring is connected to the electronics canisters.

In the preferred embodiment, the tension and bend sensors are strain gages, and all strain gages are affixed to the respective sensor mounting sections using epoxy.

The advantage of the present invention over the prior art is that the disclosed invention provides a novel method of measuring the force applied to a thin-line towed-array during the deployment and retrieval processes.

What has thus been described is an apparatus and method to measure the force applied to a thin-line towed-array during the deployment and retrieval processes. The invention includes several modules that are incorporated into the standard thin-line towed-array configuration. The modules comprise tension sensors, bend sensors, and system electronics. Tension sensors are configured to measure axial tension applied to the towed-array during the deployment and retrieval processes, while bending sensors measure the bending load applied to a simulated telemetry electronics canister. The sensor outputs are encoded and digitized by the system electronics before transmitted through a towline for further data conditioning and processing. The tension and bending sensor data provide information to evaluate the force exerted by the handling system on the thin-line towed-array and its elements.

Obviously many modifications and variations of the present invention may become apparent in light of the above teachings. For example, although strain gages were used as the sensors in the preferred embodiment, other sensing elements may be utilized. The strain gages may be configured differently than the wheatstone bridge configurations described, and a different number of sensors may be utilized. The sensors may be secured other than by epoxy. The digitizing and encoding electronics may be located within the thin-line towed-array hose, in the bend or tension compartments, or at another location. Although foam rubber secured the electronics canisters and bending sensors, other material to secure the canisters and bend sensors may be used. Substitutes for cable or rope may similarly be made to couple the axial tension sensors to each other and the coupling. A material other than aluminum may be used to form the tension and bend sensors. Although sensor redundancy was utilized, redundancy can be eliminated or increased. The electronics canisters may include filters and amplifiers as necessary to process the measurements before transmitting the measurements for processing.

In light of the above, it is therefore understood that within the scope of the appended claims, the invention may be practiced otherwise than as specifically described.

What is claimed is:

1. An apparatus for measuring a force applied to a thin-line towed array, comprising:
   a towed array hose formable as part of said thin-line towed array;
   a first coupling component located within said towed-array hose;
   a second coupling component located within said towed array hose displaced from said first coupling component, and defining a first compartment within said towed array hose between said first coupling component and said second coupling component, said first compartment having a first end proximate said first coupling component, and a second end proximate said second coupling component;
   at least one axial tension measurement device contained within said first compartment;
   a third coupling component located within said towed array hose displaced from said distinct second component and defining a second compartment within said towed array hose between said second coupling component and said third coupling component, said second compartment having a first end proximate said second coupling component and a second end proximate third coupling component;
   at least one bend measurement device located in said second compartment; p1 at least one digitization and encoding module electrically connected to said at least one axial tension measurement device and said at least one bend measurement device; and
   a processing module electrically connected to said at least one digitization and encoding module.

2. The apparatus of claim 1 wherein said at least one axial tension measurement device further comprises:
   an axial tension sensor mounting section having a first end and a second end;
   an axial tension sensor attached to said axial tension sensor mounting section;
   a first end section joined to said axial tension sensor mounting section first end, said first end section having a mounting portion opposite said connection to said axial tension sensor mounting section first end;
   a second end section joined to said axial tension sensor mounting section second end, said second end section having a mounting portion opposite said connection to said axial tension sensor mounting section second end; and
   at least two connection means, a first connection means connecting said first end section mounting portion to said first coupling component and a second connection means connecting said second end section mounting portion to said second coupling component within said first compartment.

3. The apparatus of claim 2 wherein each said end section mounting portion comprises a U-shaped cavity formed in said end section with an opening positioned away from said axial tension sensor mounting system and a bridge member traversing said cavity.

4. The apparatus of claim 3 wherein:
   said first connection means comprises a first rope connecting said first bridge member to said first coupling component; and
   said second connection means comprises a second rope connecting said second bridge member to said second coupling component, said first and second rope being constructed from a material having sufficient elasticity to allow bending of the apparatus.

5. The apparatus of claim 4 wherein:
   said at least one axial tension measurement device comprises at least two axial tension measurement devices;
   said first rope connecting a first one of said at least two axial tension measurement devices to said first coupling component;
   said second rope connecting a last one of said at least two axial tension measurement devices to said second coupling component; and
   further comprising at least one inelastic cable joined between each two axial tension measurement devices.

6. The apparatus of claim 2 wherein said axial tension sensor comprises a strain gage pair in a wheatstone bridge configuration to measure tension.

7. The apparatus of claim 1 wherein said at least one bend measurement device comprises:
   a support structure having a first bend sensor mounting section and a second bend sensor mounting section, said first bend sensor mounting section being mechanically decoupled from said second bend sensor mounting section, and said first bend sensor mounting section being orthogonally oriented with respect to said second bend sensor mounting section;
   a first bend sensor attached to said first bend sensor mounting section; and
   a second bend sensor attached to said second bend sensor mounting section.

8. The apparatus of claim 7 further comprising a rigid cylindrical shell surrounding said support structure.

9. The apparatus of claim 7 wherein:
   said first bend sensor comprises a strain gage pair in a wheatstone bridge configuration to measure bend; and
   said second bend sensor comprises a strain gage pair in a wheatstone bridge configuration to measure bend.

10. The apparatus of claim 1 wherein said processing module comprises:
    a filter joined to said at least one digitization and encoding module, said filter having at least one filter output;
    an amplifier joined to said filter output, said amplifier having at least one amplifier output; and
    a microprocessor-based system joined to said amplifier output and determining the force applied to the thin-line towed-array.

11. The apparatus of claim 10 wherein:
    said at least one bend measurement device comprises:
      a support structure having a first bend sensor mounting section and a second bend sensor mounting section, said first bend sensor mounting section being mechanically decoupled from said second bend sensor mounting section, and said first bend sensor mounting section orthogonally oriented with respect to said second bend sensor mounting section;
      a first bend sensor attached to said first bend sensor mounting section; and
      a second bend sensor attached to said second bend sensor mounting section;
    said at least one axial tension measurement device comprises:
      an axial tension sensor mounting section having a first end and a second end;
      an axial tension sensor attached to said axial tension sensor mounting section;
      a first end section joined to said axial tension sensor mounting section first end, said first end section having a mounting portion opposite said connection to said axial tension sensor mounting section first end;

a second end section joined to said axial tension sensor mounting section second end, said second end section having a mounting portion opposite said connection to said axial tension sensor mounting section second end; and at least two connection means, a first connection means connecting said first end section mounting portion to said first coupling component and a second connection means connecting said second end section mounting portion to said second coupling component within said first compartment.

12. The apparatus of claim 11 wherein:

said axial tension sensor comprises a strain gage pair in a wheatstone bridge configuration to measure tension;

said first bend sensor comprises a strain gage pair in a wheatstone bridge configuration to measure bend; and said second bend sensor comprises a strain gage pair in a wheatstone bridge configuration to measure bend.

13. The apparatus of claim 11 further comprising:

a dielectric oil filling said first compartment; and an elastomer foam filling said second compartment;

said digitization and encoding module being located in said second compartment.

* * * * *